S. HERR.
SEED RECLAIMING PROCESS.
APPLICATION FILED DEC. 3, 1920.
1,405,690.
Patented Feb. 7, 1922.
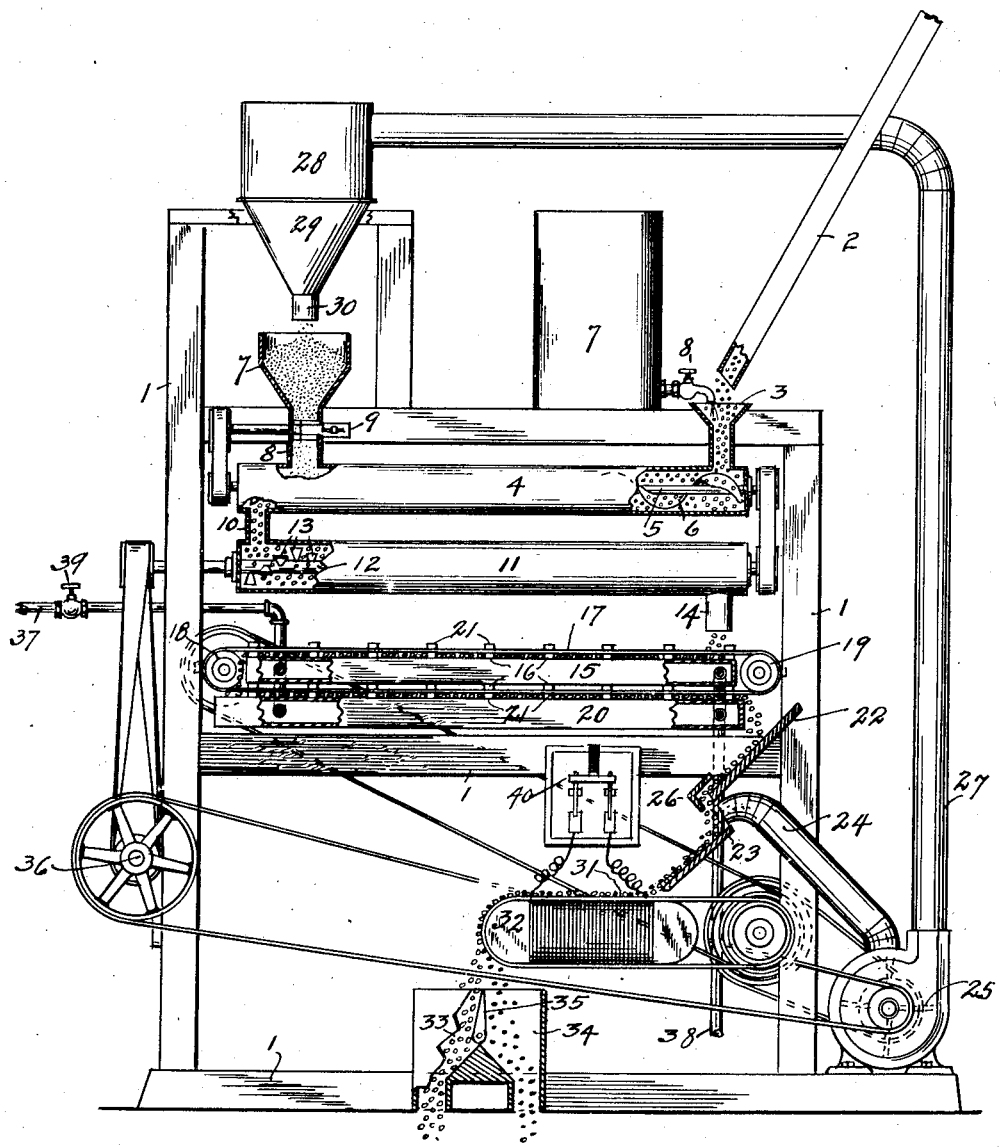
Inventor,
Shirl Herr,
By Joseph A. Minturn
Attorney.

UNITED STATES PATENT OFFICE.

SHIRL HERR, OF CRAWFORDSVILLE, INDIANA, ASSIGNOR TO CRAWFORDSVILLE SEED COMPANY, OF CRAWFORDSVILLE, INDIANA, A COPARTNERSHIP COMPOSED OF ABNER H. FLANIGAN, SHIRL HERR, AND FROST R. FREEMAN.

SEED-RECLAIMING PROCESS.

1,405,690.  Specification of Letters Patent.  Patented Feb. 7, 1922.

Application filed December 3, 1920. Serial No. 427,971.

*To all whom it may concern:*

Be it known that I, SHIRL HERR, a citizen of the United States, residing at Crawfordsville, in the county of Montgomery and State of Indiana, have invented new and useful Improvements in Seed-Reclaiming Processes, of which the following is a specification.

While this invention is the result of my experiments and practice in removing undesirable seeds from the desirable crop varieties as evidenced by my Patent No. 813,890, issued February 27, 1906, wherein moistened mucilaginous coated seeds are made to adhere to a traveling apron and are thereby readily removed from the non-mucilaginous ones; Patent No. 1,216,803, issued February 20, 1917, wherein sawdust or the like is made to adhere to moistened mucilaginous seeds forming larger particles that are more easily removed; and Patent No. 1,283,512, issued November 5, 1918, wherein pressure is applied to sawdust or the like absorbent material to press it into low pressure resisting surfaces of undesirable seeds which are then removed, it is applicable to other than seed-cleaning purposes and contemplates the substitution of iron filings or other material of magnetic permeability for sawdust, causing said magnetic substitute to adhere to the bodies to be removed, and the removal of the bodies with attached magnetic particles from the rest of the mass, by passing said mass through the field of a powerful electro-magnet. While the present invention provides a better means for removing certain undesirable seeds from the desirable crop-varieties, it is not desired to limit the process to seed cleaning.

The object of this invention is, therefore, to separate hard smooth-surfaced bodies of any kind, or bodies not having a mucilaginous coat or coat adapted to be softened by moisture by causing particles of magnetic permeability to adhere to the last mentioned bodies by mechanical or chemical means or a combination of both, and passing the mass through the field of an electro-magnet of sufficient force to segregate the bodies with attached magnetized particles from the rest.

I accomplish the objects of this invention by the means illustrated more or less diagrammatically in the accompanying drawing showing a machine in elevation and partial section.

The mechanical elements of my device are supported by a frame 1, of any usual and suitable construction. The bin (not shown) in which the supply of seeds to be cleaned, is discharged through an inclined pipe 2, into a hopper 3, which discharges into the end of a mixing tube 4. Extending longitudinally through the tube 4, is a shaft 5 on which a screw-conveyor 6 is mounted, and which moves the contents of the tube to the opposite end from hopper 3, while mixing said contents. A tank 7 contains water, preferably to which oxalic acid has been added, and this mixture is discharged in limited quantities through a faucet 8, into the hopper 3, where it comes in contact with the seeds to be cleaned and is mixed with said seeds to thoroughly moisten their outer coatings by the action of the screw-conveyor 6.

Located above the tube 4 near the opposite end of the tube from where the hopper 3 is located, is a hopper 7 in which are small particles of a material of high magnetic permeability, in my practice this has been iron filings, which are discharged through a tubular outlet 8 into the conveyor-tube 4. A rotating feed wheel in the tube 8, acting in conjunction with an adjustable plate 9, provides means for regulating the quantity of iron filings supplied to the interior of tube 4.

At the end of tube 4 adjacent the tube 8, is a discharge pipe 10 from tube 4 into a lower horizontal tube 11, longitudinally through which is a rapidly rotating shaft 12, having radial beater-blades 13 arranged in a spiral series of several turns reaching from end to end of so much of shaft 12 as is contained within the tube 4. The shaft 12 is rotated rapidly enough to cause the associated seeds and iron filings to be thrown centrifugally against the interior walls of the tube 11 to positively drive the iron filings into the seed coats that are susceptible to softening in the presence of moisture, or that have hulls sufficiently soft to be permeated, or have broken, creased or irregular exteriors into which the filings are driven so as to become wedged and there retained.

The seed after being thus treated is discharged at the other end of tube 11, through pipe 14, upon a hollow steam table 15, along which table the seeds are carried to thoroughly dry them, by transverse slats 16, attached to endless belts 17, passing around pulleys 18 and 19 at the respective ends of the steam-table. The seeds are raked off of the table 15 upon a similar steam-table 20, below, longitudinally of which the same belts travel causing outside slats 21 attached to the belts, to rake the table surface and move the seeds lengthwise of the table to further dry them. The material under treatment is raked off of the end of the table 20 upon an inclined board 22 in such a dry condition that the impact against the board loosens all of the iron filings that are not positively attached to the seeds and in this condition the material is dropped from board 22 upon a lower and similar inclined board 23. In the space between the two boards is the mouth of a pipe 24 which connects with the eye of a suction fan 25. The material discharging by gravity from the board 22 is directed across the mouth of pipe 24 by an angular deflector 26 and the loose iron filings are removed from the heavier seeds by the suction of the fan and are carried up through pipe 27 and discharged into a holder 28 from which they are discharged through the funnel-shaped bottom 29 and pipe 30, into the hopper 7 for further association with other seeds in my seed reclaiming process.

The material discharging by gravity from the lower board 23 is substantially free from unattached iron filings but it comprises a mixture of smooth surfaced seeds to which there are no adhering iron particles, with seeds to which there are adherent particles. This mixture drops from board 23 upon an endless apron 31, which travels around an electro-magnet 32, energized from a suitable source. The apron makes a return under the electro-magnet around a portion where the magnetic effect is strongest. Those seeds to which there are adherent iron-filings are magnetically attracted and stick to the belt until they reach an under portion free from the magnetic effect whereupon they drop by gravity, but that occurs after the other seeds—those having no adherent iron filings and therefore magnetically unattracted, have fallen from the belt by gravity; and the difference in location of these discharges makes easy the separation of seeds with adherent iron filings from those having none.

In the device of the drawing, the non-magnetic particles are deposited in receptacle 33, whereas the magnetizable ones or tailings are deposited in the receptacle 34. An adjustable wing or gate 35 determines by its position the completeness of the separation.

A knife switch 40 provides means for cutting off the current from magnet 32.

Power to drive the apron and the various shafts from a main shaft 36 is transmitted by pulleys and belts in the usual manner.

Steam to the tables 15 and 20 is supplied through pipe 37 controlled by valve 39, and the exhaust is through pipe 38.

The operation, briefly, is as follows: Seed to be reclaimed is supplied through pipe 2 to hopper 3, where water from a tank 7 to moisten the coating of those of a mucilaginous nature or capable of being softened by moisture, is added from tank 7, and a complete mixture insured by the action of conveyor 6 in tube 4. Iron filings from hopper 7 are added to the moistened seeds in regulated quantities and the resulting mass is violently agitated in tube 11 to physically attach the filings to such seeds as will take them. Then the material is dried on steam tables 15 and 20, after which the non-adherent filings are removed by suction and are returned to hopper 7 for further use and the separation of seeds without non-magnetic particles adhering to them from those with adherent particles of magnetic permeability is effected by passing the mixture on a traveling apron over an electro-magnet which holds the magnetic particles to the apron after the others have dropped by gravity and separation is thereby obtained.

It is obvious that those skilled in the art may vary the details of construction of the mechanism here shown and described without departing from the spirit of my invention and therefore I do not desire to be limited to such features any more than is required by the appended claims, and what I claim is:

1. The process of separating and classifying heterogeneous material which consists in causing particles of magnetic permeability to adhere directly to as much of the material as have normal characteristics capable of such adhesion, then passing the mass through the field of a magnet to segregate the bodies with attached particles of magnetic permeability from the rest of said material.

2. The process of separating and classifying heterogeneous material comprising portions to which particles of magnetic permeability may be made to directly adhere and other portions to which said particles will not directly adhere, which consists in developing the adhesiveness of the portions normally having that quality, then causing particles of magnetic permeability to adhere thereto, and then passing the mass through the field of a magnet to segregate the bodies with attached particles of magnetic permeability from the rest of the said material.

3. The process of separating and classifying heterogeneous material which consists in causing particles of magnetic permeability to adhere by impact directly to as much of the material as have normal characteristics capable of such adhesion, then passing the mass through the field of a magnet to segregate the bodies with attached particles of magnetic permeability from the rest of said material.

4. The process of separating and classifying heterogeneous material which consists in increasing the adhesiveness of those portions having normal adhesive properties by the addition of moisture, then causing particles of magnetic permeability to adhere directly to said moistened articles, then removing the moisture, and then passing the mass through the field of a magnet to segregate the bodies with attached particles of magnetic permeability from the rest of said material.

5. The process of separating and classifying heterogeneous material a portion only of which has adhesive properties, which consists in increasing the adhesiveness of those portions having normal adhesive properties by the addition of moisture, then causing particles of magnetic permeability to adhere directly to said moistened articles by impact to as much of the material as have characteristics capable of such adhesion, then removing the moisture, and then passing the mass through the field of a magnet to segregate the bodies with attached particles of magnetic permeability from the rest of said material.

6. The process of separating desirable from undesirable seeds which consists in introducing particles of magnetic permeability into the mixed seeds, causing said introduced particles to adhere directly to the undesirable seeds, and then removing the seeds with attached particles of magnetic permeability by magnetic attraction.

7. The process of separating seeds having normal adhesive surfaces from those that have nonadhesive surfaces which consists in moistening the seed mixture to increase the adhesiveness, introducing particles of magnetic permeability into the seed mixture, causing said introduced particles to adhere directly to the moistened seeds having adhesive surfaces by impact, drying the mixed seeds and then removing the seeds with attached particles of magnetic permeability by magnetic attraction.

Signed at Crawfordsville, Indiana, this 20th day of November 1920.

SHIRL HERR.